United States Patent [19]

Kraus et al.

[11] Patent Number: 4,974,466
[45] Date of Patent: Dec. 4, 1990

[54] INFINITELY VARIABLE TRACTION ROLLER TRANSMISSION

[75] Inventors: Charles E. Kraus; Charles B. Lohr, both of Austin, Tex.

[73] Assignee: Excelermatic Inc., Austin, Tex.

[21] Appl. No.: 441,322

[22] Filed: Nov. 27, 1989

[51] Int. Cl.$^5$ ............................................. F16H 15/38
[52] U.S. Cl. ........................................... 74/200; 74/213
[58] Field of Search ...................... 74/190.5, 200, 208, 74/213

[56] References Cited

U.S. PATENT DOCUMENTS

| | | | |
|---|---|---|---|
| 3,030,817 | 4/1962 | Tomaszek et al. | 74/200 |
| 4,086,820 | 5/1978 | Kraus et al. | 74/200 |
| 4,830,578 | 5/1989 | Kraus | 417/223 |

FOREIGN PATENT DOCUMENTS 817984 10/1951 Fed. Rep. of Germany ........ 74/200

Primary Examiner—Allan D. Herrmann

[57] ABSTRACT

In an infinitely variable transmission wherein two toric traction discs are rotatably supported opposite one another so as to define therebetween a toric cavity in which at least two motion transmitting traction rollers are disposed in engagement with the toric discs and supported by pivot trunnions, means are provided for controllably pivoting the trunnions for a transmission ratio change, and cross-links are mounted to the end faces of the trunnions so as to permit pivotal motion of the trunnions only in unison and in an opposite sense, the cross-links have overlapping center sections with stop surfaces arranged to engage one another in the pivotal end positions of the trunnions for limiting their pivotal movement.

4 Claims, 4 Drawing Sheets

INFINITELY VARIABLE TRACTION ROLLER TRANSMISSION

BACKGROUND OF THE INVENTION

The invention relates to an infinitely variable traction roller transmission in which power is transmitted through traction rollers pivotally supported between toric input and output discs.

In such transmissions, the traction rollers are mounted on support structures which, when pivoted, cause engagement of the traction rollers with the toric discs in circles of varying diameters depending on the desired transmnission ratio. The pivotal traction roller support structures are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

In U.S. Pat. No. 4,858,484 by Charles E. Kraus in which two traction rollers are arranged between, and in engagement with, opposite toric traction discs for the transmission of motion therebetween, each traction roller is supported by a pivotal support trunnion which has support rollers disposed at opposite ends thereof and supported on partial circular tracks disposed on the housing's inner surface for direct trunnion support. The traction rollers are supported on the pivot trunnions by force transmitting means which, for inexpensive transmissions, include slacks of Belleville springs. The housing tracks may have a center of curvature which is slightly off-set with regard to the pivot axis of the trunnions in order to provide greater compression of the Belleville spring, that is, greater disc engagement forces in one pivotal end position of the pivot trunnions than in their opposite pivotal end positions.

The arrangement according to applicant's application Ser. No. 07/259,043 utilizes a single support roller for each trunnion which is received in a partial circular track section mounted in the housing for forcing the trunnion and the associated traction roller into firm engagement with the toric discs for permitting transmission of motion therebetween. An axially projecting control end of each trunnion is supported so as to be slightly movable in a plane normal to the axis of the toric discs, the control ends of the trunnions having means associated therewith for tilting the trunnions in unison in said plane for the initiation of a transmission ratio change.

In each case the traction roller support trunnions must operate in unison, that is, they must be at the same transmission ratio pivotal position in order to avoid slip. To insure operation of the trunnions in unison the arrangement according to U.S. Pat. No. 4,830,578 utilizes cables extending around pulley structures on the trunnions. However, such cables have experienced breakage as a result of jerky motions of the trunnions.

It is therefore the object of the present invention to provide a transmission of the type referred to above with a reliable arrangement for the interconnection of the trunnions for firm control of their cooperation.

SUMMARY OF THE INVENTION

This is achieved by an infinitely variable transmission with two toric traction discs rotatably supported opposite one another so as to define therebetween a toric cavity in which at least two traction rollers are disposed in radial symmetry in engagement with the toric discs and supported by pivot trunnions with means for pivoting the trunnions for a transmission ratio change and cross-links mounted to the axial ends of the trunnions so as to permit pivotal motion thereof only in unison and in an opposite sense, wherein the cross-links have overlapping center sections with opposing stop surfaces so arranged as to ensure one another in the pivotal end positions of the trunnions for limiting their pivotal movement.

SHORT DESCRIPTION OF THE DRAWINGS

DESCRIPTION OF THE PREFERRED EMBODIMENT

Figure 1:
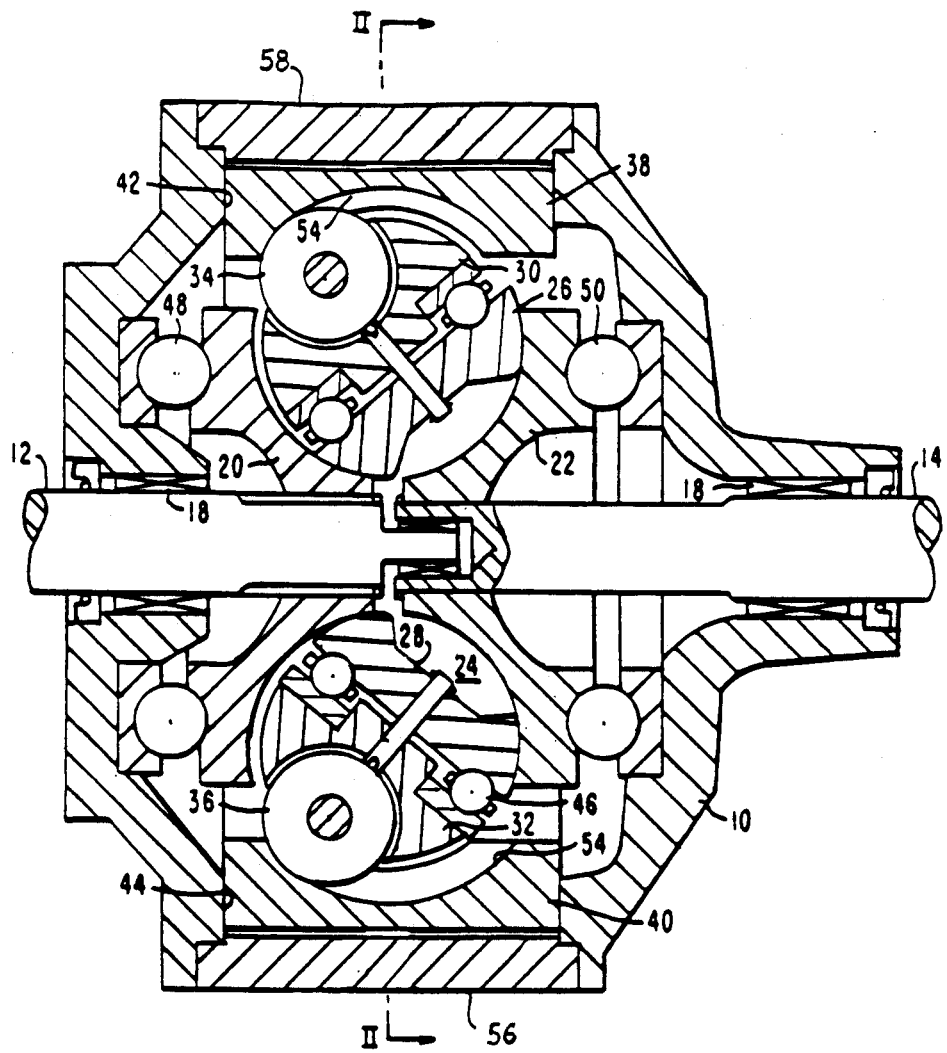
FIG. 1 is an axial cross-sectional view of the traction roller transmission.

A simple traction roller transmission as shown in FIG. 1 consists of a housing 10 having coaxial input and output shafts 12, 14 rotatably supported therein by bearings 16 and 18. Associated with the input and output shafts 12, 14 are toric discs 20, 22 which are so arranged opposite one another that a toric cavity 24 of circular cross-section is defined therebetween. Within the toric cavity 24 traction rollers 26, 28 are rotatably supported in engagement with the toric traction discs 20, 22. The traction rollers 26, 28 are supported in the housing 10 by pivot trunnions 30 and 32 which are pivotally supported by way of trunnion rollers 34 and 36 running on hard metal track members 38, 40 received in track cavities 42, 44 formed in the housing 10. Each of the pivot trunnions 30, 32 carries a traction roller bearings 46 for rotatably supporting the associated traction rollers 26, 28 which are forced into firm engagement with the traction discs 20 and 22 by way of the trunnion rollers 34, 36, the traction discs 20 and 22 being axially supported by axial thrust bearings 48 and 50. The engagement forces of the traction rollers 26, 28 with the toric traction discs 20, 22 depend on the loading applied by the track members 38, 40. The circular support grooves 54 in the track members 38, 40 may be slightly eccentric with respect to the center circle of curvature of the toric cavity 24 in order to provide larger contact forces for the traction rollers in one pivotal end position of the pivot trunnions 30 and 32, specifically, in the position for lowest output shaft speed and highest output shaft torque as shown in FIG. 1.

Figure 2:
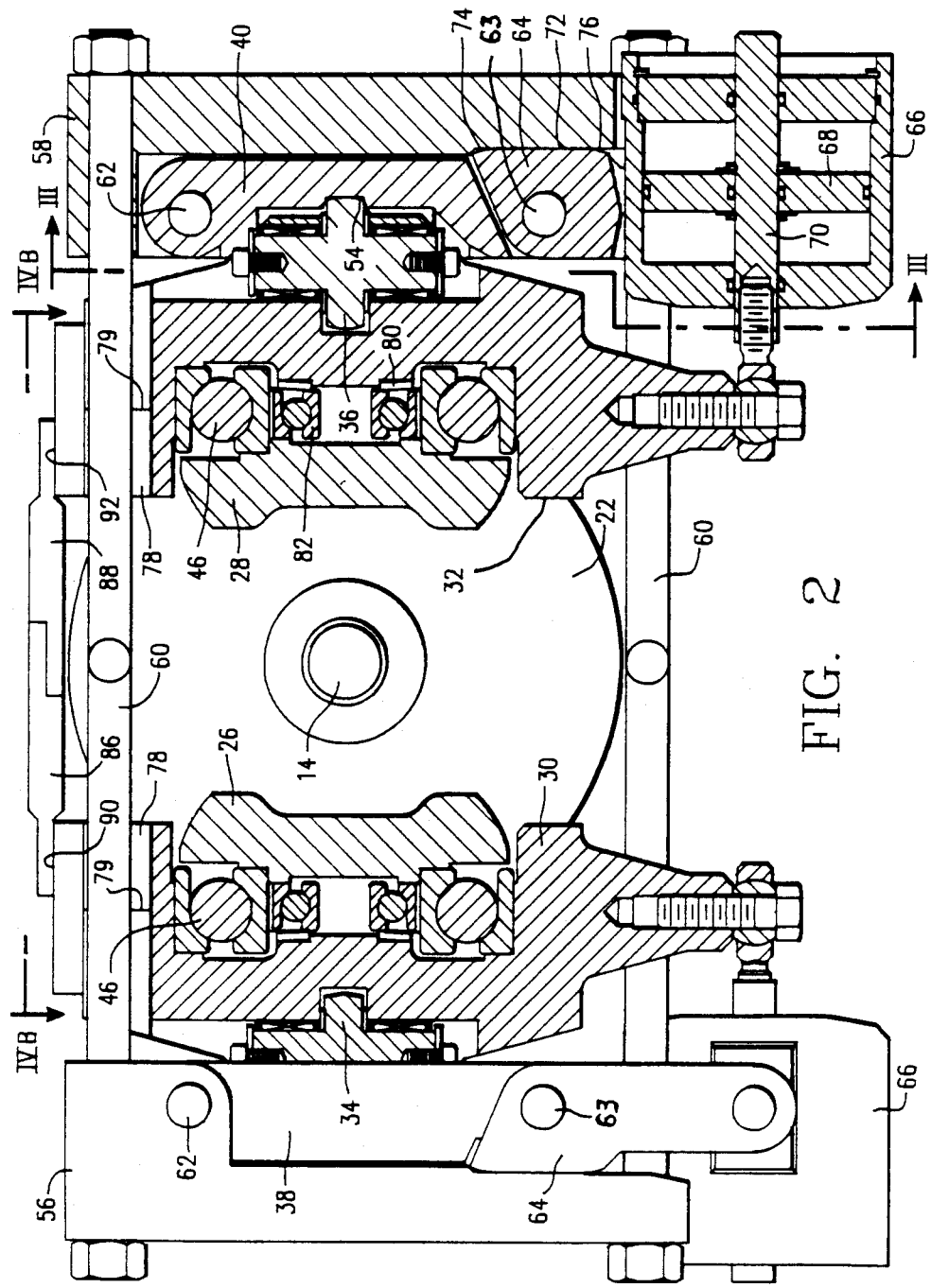
FIG. 2 is a cross-sectional view along line II—II of FIG. 1.

FIG. 2 shows the transmission without a housing. There are opposite support members 56 and 58 which are held together by retaining rods 60. The track members 38 and 40 are pivotally supported at one end by pivotal supports or by hinges 62 as shown in the drawings. At their other ends they are hinged by hinge pins 63 to leverage arms 64 which abut the support members 56 and 58. The support members 56 and 58 carry operating cylinders 66 provided with pistons 68 and piston rods 70 which are linked to the control ends of the trunnions 30 and 32. The trunnions 30 and 32 carry the traction rollers 26 and 28 as mentioned earlier and are forced toward the toric discs 20 and 22 by the track members 38 and 40 with forces which depend on the forces applied by the pistons 68 and piston rods 70 to the adjacent control ends of the trunnions 30 and 32 and which are generatred by the reaction forces transmitted from the cylinder 66 to the cylinder support ends of the leverage arms 64. The leverage arms 64 have force control surface 72 which provide for some leverage to multiply the traction roller engagement forces applied to the trunnions 30 and 32 by way of the trunnion rollers 34 and 36.

Peferably the force control surfaces 72 of the leverage arm 64 are somewhat curved at their opposite ends 74 and 76 to provide for reduced wear at their tilting edges. The leverage arms 64 are preferably forked with the cylinders 66 received between the forked arms 65 and linked to the free ends of the trunnions 30, 32.

Figure 3:
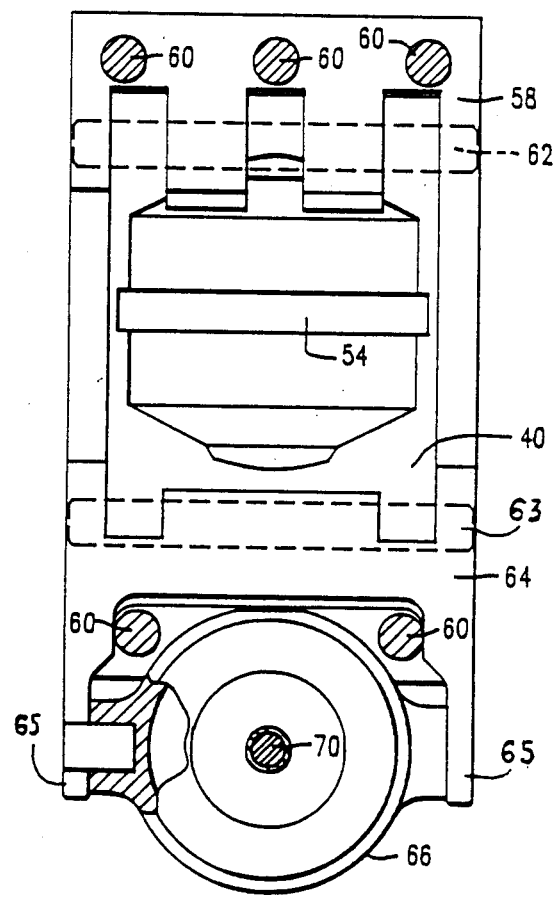
FIG. 3 is a view along line III—III of FIG. 2.

As shown in FIG. 3 there are two retaining rods 60 extending between the support members 56 and 58 at one side of the transmission and three at the opposite side thereof, a center retaining rod and two outer retaining rods. Adjacent the center rod 60 the trunnions 30, 32 are provided with grooves 78 which receive the center rod 60 and which are so shaped and sized that the freedom of the trunnions is limited by their engagement of the center rod 60. The narrowest center sections 79 of the grooves 78 are disposed in a plane receiving the pivot axis of the trunnions.

The traction roller bearing 46 as shown in FIG. 2 are such that they permit inward movement of the traction rollers into engagement with the toric discs by the force of the Belleville springs 80 applied through the auxiliary bearings 82 in order to keep the traction rollers in engagement with the toric discs 20, 22 even when no torque is transmitted through the transmission.

Figure 4A:
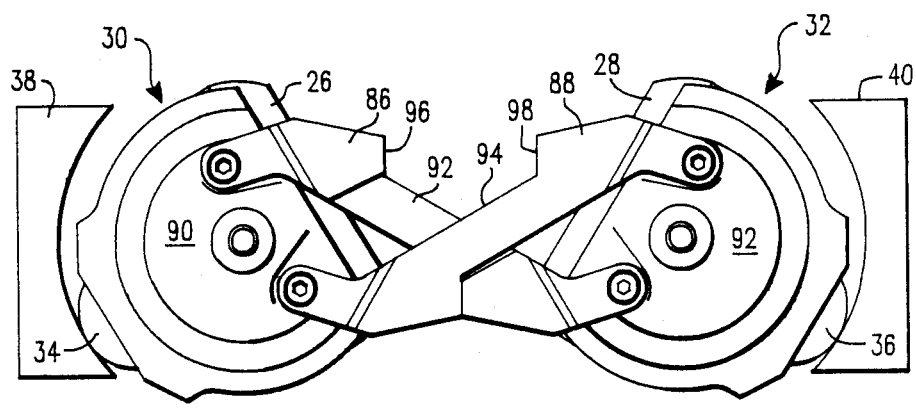
FIGS. 4A and 4B are views along lines IVB—IVB of FIG. 2 for different trunnion pivot positions.
Figure 4B:
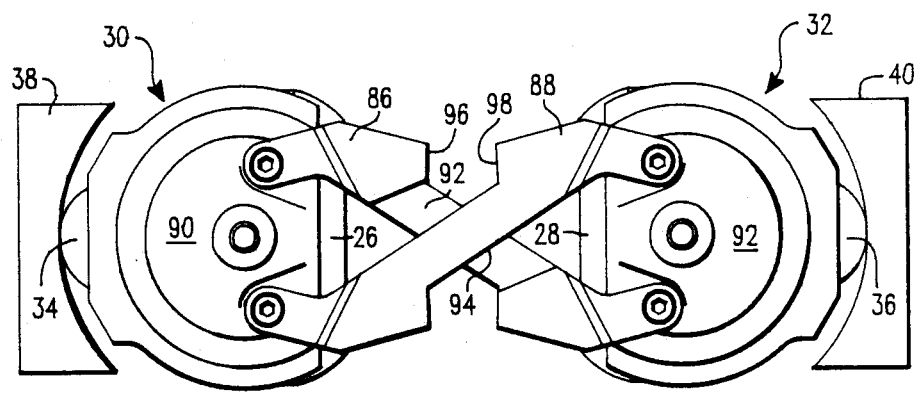

In order to insure movement of the trunnions in unison, they have cross-links 86 and 88 pivotally mounted to their end faces 90, 92 as shown more clearly in FIG. 4. The links 86, 88 permit pivoting of the trunnions 30 and 32 pnly in the opposite sense and in unison. They have cut-out areas 92 and 94 in their overlapping center sections and, adjacent the cut-out areas, they have stop structures perferably in the form of surfaces 96 and 98 adapted to limit pivot movement of the trunnions upon engagement of the stop surfaces as shown in FIG. 4A.

Figure 5:
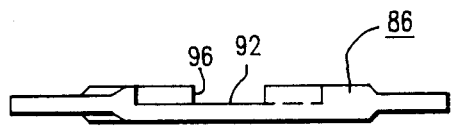
FIG. 5 is a side view of one of the links.

FIG. 5 shows the shape of the link 86.

Operation of the Trunnion Support Arrangement

Whenever a torque is transmitted through the transmission there is a reaction moment applied to the trunnions 30, 32 by the traction rollers 26, 28 which is taken up by the cylinder 66. The cylinders 66 transmit the respective reaction force to the leverage arms 64 by which they are supported and which are pivoted thereby so as to force the track members 38 and 40 and the associated traction rollers 26 and 28 toward one another and into firm engagement with the toric disc 20, 22 with a force which is proportional to the torque transmitted through the transmission.

For a change of the transmission ratio, admission of pressurized fluid to the cylinders 66 at the appropriate side of the piston 68 is controlled so as to tilt the two trunnions 30, 32 slightly in the same circumferential sense with respect to the axis of the toric discs 20, 22 such that, upon rotation of the toric discs 20, 22, the traction rollers 26, 28 will roll to larger circles of engagement with one and smaller circles of engagement with the other of the toric discs 20, 22. When the desired transmission ratio is reached, the trunnions 30, 32 are returned to their neutral positions in which the momentary transmission ratio is maintained.

The cross-links 86, 88 insure the proper transmission ratio setting for both of the trunnions 30, 32 so that slipping of the traction roller 26, 28 is avoided. They also safely limit the transmission ratio range as they permit pivoting of the trunnions 30, 32 only up to the engagement of their stop surfaces 96, 98.

The transmission as described is quite simple and controls pivoting of the trunnions 30, 32 with few sturdy parts. Both links 86, 88 are identical in shape providing for relatively low manufacturing costs and the arrangement as a whole is sturdy enough to withstand the jerking forces appearing in the transmission from time to time.

What is claimed is:

1. An infinitely variable traction roller transmission comprising: a support structure; two toric traction discs rotatably supported by said support structure, one for rotation with an input shaft and the other for rotation with an output shaft, said toric discs having opposite traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported by a pivot trunnion supported so as to pivot about a control axis which is essentially tangential to the center circle of said toric cavity; means for controllably pivoting said pivot trunnions for a transmission ratio change, and cross-links mounted to the end faces of said trunnions so as to permit pivoting of siad trunnions only in an opposite sense, said cross-links having overlapping center sections with stop structures provided on said links adjacent their center sections and adapted to engage one another in the pivotal end positions of said trunnions so as to limit pivotal movement of said trunnions.

2. A traction roller transmission according to claim 1, wherein said cross-links have cut-out areas in their overlapping center sections, with the center section of each of said cross-links being received in thge cut-out area of the other.

3. A traction roller transmission according to claim 2, wherein said stop structures are stop surfaces formed at the opposite ends of said cut-out areas so as to abut one another in the pivotal end positions of said trunnions.

4. A traction roller transmission according to claim 1, wherein said cross-links are all identical in shape.

* * * * *